Dec. 15, 1970     R. C. FENWICK     3,548,310
ANTENNA CURRENT DISTRIBUTION MEASUREMENT SYSTEM
Filed July 31, 1967     3 Sheets-Sheet 1

INVENTOR.
RICHARD C. FENWICK
BY
Moody and Kuthinger
ATTORNEYS

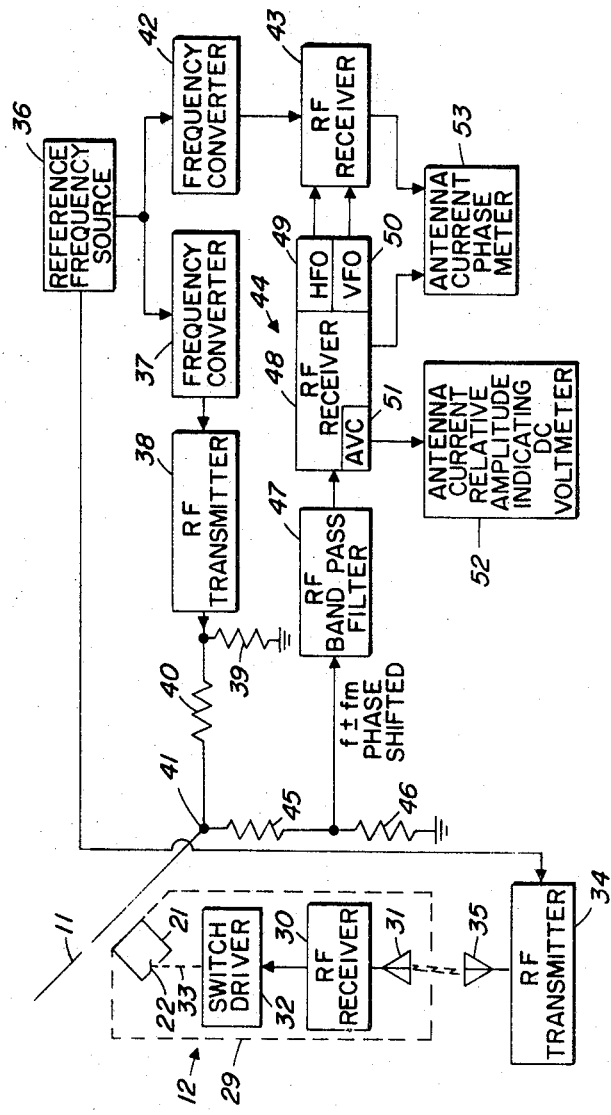
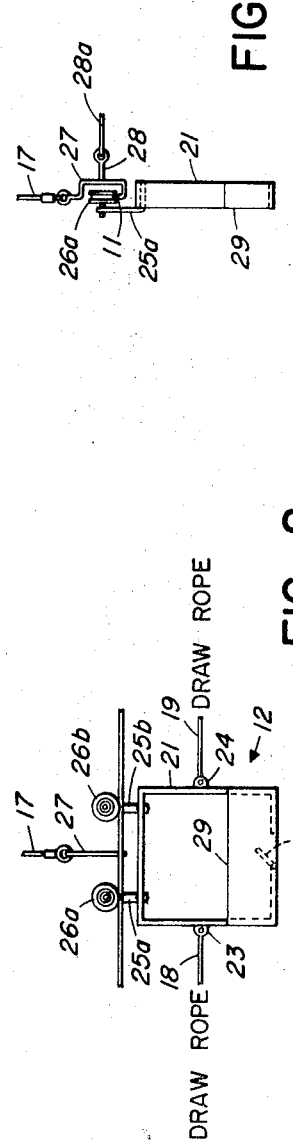

United States Patent Office 3,548,310
Patented Dec. 15, 1970

3,548,310
ANTENNA CURRENT DISTRIBUTION MEASUREMENT SYSTEM
Richard C. Fenwick, Richardson, Tex., assignor to Collins Radio Company, Cedar Rapids, Iowa, a corporation of Iowa
Filed July 31, 1967, Ser. No. 657,388
Int. Cl. H04b 1/00
U.S. Cl. 325—67                    5 Claims

ABSTRACT OF THE DISCLOSURE

An antenna current distribution measurement system including the introduction of an obstacle in the near field of the antenna being current amplitude and phase measured. Introduction of such an obstacle in the form of a relatively small antenna acts as a perturber of input impedance that is a known function of current on the antenna structure near the obstacle (i.e., the perturber antenna). The perturber antenna includes an antenna circuit subject to being opened and closed for inducing a modulation effect desired in an elongate antenna line element being measured and with this approach accomplished without requiring the running of wires to a probe or perturber near the antenna line being measured.

---

Figure 1:
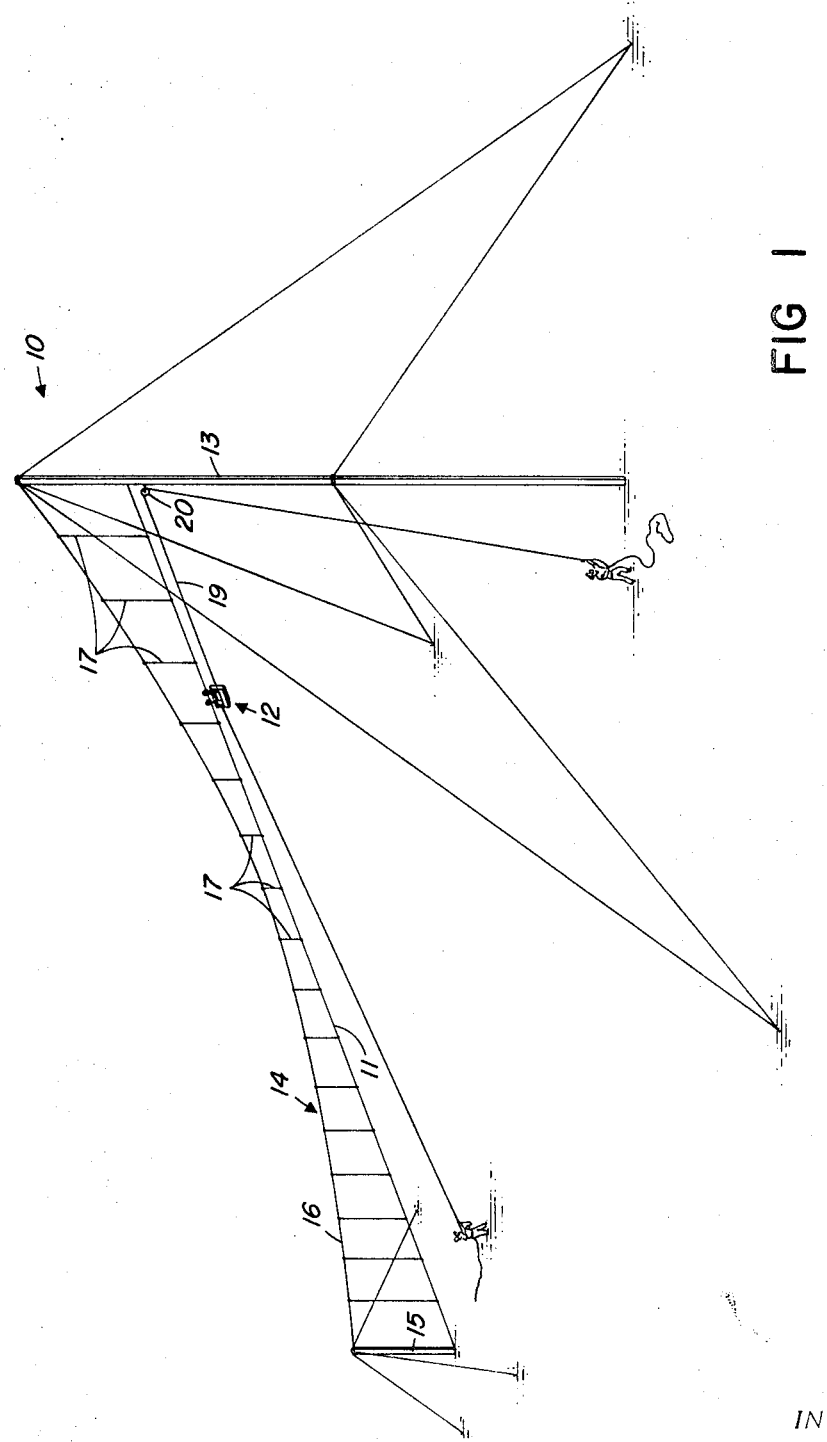

This invention relates in general to the determination of antenna radiation patterns as derived from the measurement of antenna current distribution especially with large antennas, and in particular, to a modulating perturber system with a perturber structure moved along the antenna for measuring antenna curret amplitude and phase without requiring the running of wires to a probe near the antenna.

With many antenna configurations radiation patterns may be satisfactorily attained through measurement directly using scale models. However, with many of the larger antena systems, for example, with large "V" antennas, the accuracy obtained with scale models of tractible size is not sufficient. In order that the field patterns of such large antennas may be more accurately determined, antenna current distribution measurements must be made with actual antenna installations or at least with large scale models of such antenna systems. An improved structure and method for measuring antenna current amplitude and phase was required from existing methods requiring the running of wires to a probe near the antenna element or elements being checked. With these probe measuring systems requiring the running of wires, the wires may be either external or internal to antenna structural elements. With external wires, the wires can affect the antenna current distribution, and furthermore, moving of the probe and wires becomes mechanically difficult. If such probe run wires are internal to the antenna conductor, this conductor must be of rather large diameter and hollow. It is important that such a structural limitation not be imposed with respect to various relatively large antenna structures being antenna current amplitude and phase measured.

It is, therefore, a principal object of this invention to provide a modulating perturber system for measuring antenna current amplitude and phase to a high degree of accuracy, and to accomplish this with minimized undesired affect on antenna current distribution other than the desired perturber signal modulation.

A further object with such an antenna modulating perturber system is to substantially isolate those impedance changes in the antenna due to the perturber from those caused by vibration and movement in the wind.

Features of this invention useful in accomplishing the above objects include, in various embodiments, a perturber structure near the antenna with the perturber structure being, for example, a dipole or a loop with a set of terminals. A preferred perturber structure is a loop with operation optimized by orientation of the loop in a plane substantially parallel to the antenna wire, tube or rod being current distribution measured. Modulation of the antenna is accomplished by opening and closing the set of terminals of the dipole or loop in a periodic manner preferably at a relatively low frequency but at such a frequency as to isolate the impedance changes due to the perturber modulation from antenna input impedance variations caused by vibration and movement of the antenna wire, tube or rod in wind. The rate of electrically opening and shorting the terminals of the looped circuit may advantageously be done at an audio frequency rate, $F_M$, thus amplitude modualting the wave reflected from the loop back to the antenna element being modulated. The amplitude and phase of either sideband signal at $F \pm F_M$, with F being the transmitted signal frequency, may be observed at the antenna input terminals. From the amplitude and phase of the sideband signal being measured at the antenna input terminals the antenna current distribution is deduced from the change in amplitude and phase of the sideband signal as the loop is moved from the input terminal end of the antenna element to the other end of the antenna wire, tube or rod, or as the loop is moved from the far end to the signal input end, as the case may be.

A specific embodiment representing what is presently regarded as the best mode of carrying out the invention is illustrated in the accompanying drawings.

In the drawings:
FIG. 1 represents a catenary suspended transmitting antenna element that may be in the form of a conductive wire, tube or rod, as the case may be, with one of applicant's antenna perturbers suspended for substantially uniformly spaced relation and substantially constant orientation relative to the antenna element as the perturber is moved along the antenna element from one end to the other;

FIG. 2, a side view of the antenna perturber of FIG. 1 in a loop configuration supported by rollers from the antenna element in substantially parallel planer relation with the antenna element throughout the range of movement of the perturber along the antenna element from end to end;

FIG. 3 is a partial end view showing the perturber of FIG. 2 and the suspension arrangement and roller arrangement of the structures shown in FIG. 2.

Figure 5:
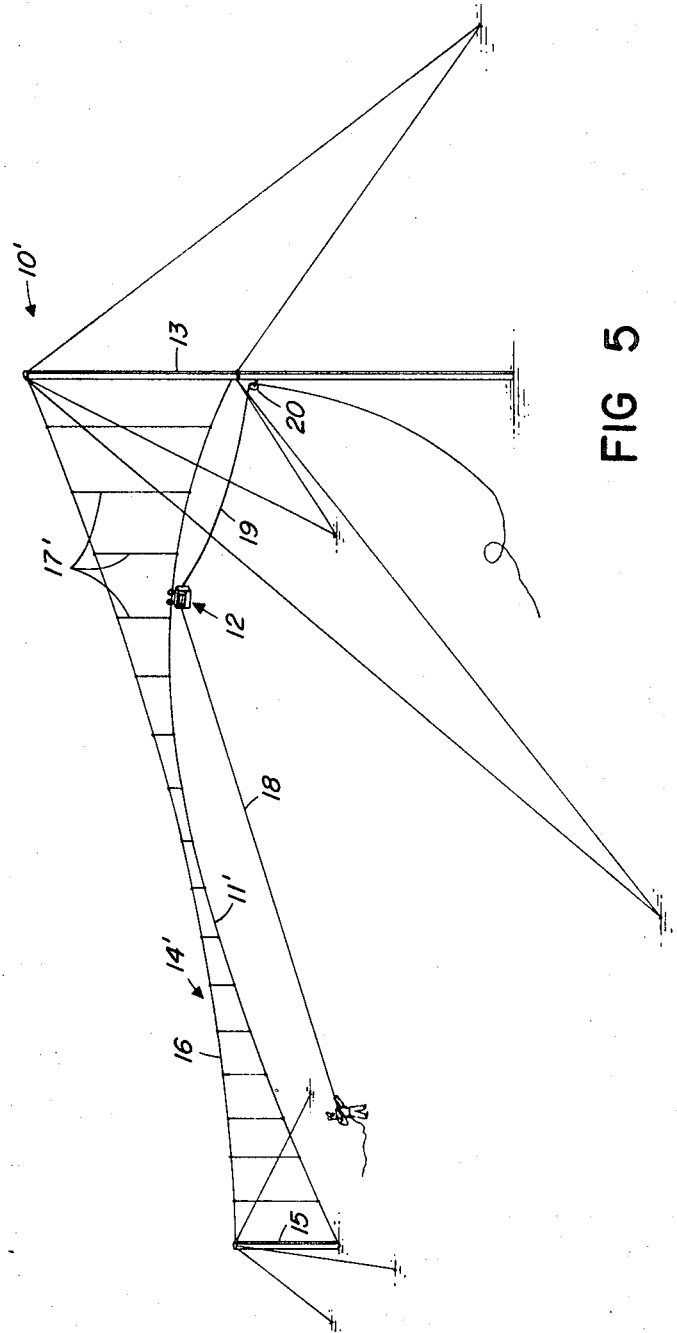

FIG. 4, a block and schematic diagram of one antenna current distribution measuring embodiment useful with applicant's antenna perturbing system; and, FIG. 5, is another antenna element configuration with the perturbing current distribution measuring system substantially the same as with the FIG. 1 antenna system.

Referring to the drawings:
The antenna structure 10 of FIG. 1 includes antenna element 11 with respect to which antenna measurements are made through the use of a perturber device 12 mounted for movement along and substantially from end to end of the antenna element 11 being measured. The antenna element 11 being current amplitude and phase measured may be, for example, number 8 Copperweld wire suspended between ground and a wooden pole 13 that is supported in this particular instance as a substantially straight antenna element by a catenary assembly 14 suspended between two wooden poles 13 and 15. The catenary assembly 14 may include, for example, a one-half inch Dacron rope 16 suspended between the two wooden poles 13 and 15 equipped with vertical 3/16 inch Dacron rope jumpers 17 suspended substantially vertically from the rope 16 and attached to the antenna element wire 11 so as to support it as substantially a straight antenna element in this instance. The perturber structure 12 is equipped with draw ropes 18 and 19 and with the draw rope 19 extended through a pulley 20 mounted on wooden pole 13 in order that the perturber structure may be pulled back and forth along the antenna element 11 from end to end thereof as desired.

Referring also to FIGS. 2 and 3 for greater detail of the perturber structure 12 and the antenna element 11 supporting structure, the perturber structure 12 includes an outer conductive loop 21 of rectangular shape equipped with a switching device 22 that while indicated as being at the bottom, may be at any place in the loop for opening and shorting terminals of the loop 21. The loop also includes front and rear connections 23 and 24 for draw ropes 18 and 19, respectively. The perturber structure 12 is shown to also have supporting links 25a and 25b connected to the top of the loop 21 in such a manner as to suspend the perturber structure 12 from grooved rollers 26a and 26b that are particularly designed to be supported by and roll along the antenna element wire 11 as the perturber structure 12 is pulled from position to position therealong by the draw ropes 18 and 19. It should be noted that the bottom ends of the vertically suspended rope jumpers 17 are terminated in a connective fitting 27 so designed as to provide desired aligning support for the antenna element wire 11 without impeding the rolling passage of the rollers 26a and 26b of the perturber structure 12. The antenna element 11 supporting fixtures 27 connected to each rope jumper 17 may also be provided with a connection 28 for lateral tether ropes 28a for horizontal displacement and curving of the antenna wire element 11 as may be desired in testing various antenna configurations. Please note that the switching device 22 may be either a mechanical switch (detail not shown) or an electronic switch (detail not shown) such as a transistor alternately biased between conductive and nonconductive states and that either a mechanical or electronic switch device 22 would be controlled in its switching action by a combined control structure and switch driver assembly 29.

The combined control structure and switch driver assembly 29 of the perturber structure 12 may be completely self-contained, with respect to a controlling signal source, in having its own clock or oscillator signal source preset to a desired frequency in controlling the actuation of switch 22. Alternately, it may be subject to an RF received signal control such as illustrated with the block and schematic diagram of FIG. 4. With this system, the combined control structure and switch driver assembly 29 includes an RF receiver 30 and receiving antenna 31 combination for developing an output signal applied as a controlling signal to a switch driver 32 for controlling the output therefrom through line 33 to the switch 22. The line 33, in the case of a mechanical switch 22, is a mechanical drive line, and in the case of an electronic switch 22, it is an electronic circuit biasing system connection. A transmitter 34 with a transmitting antenna 35 is provided for transmission of the controlling signal to the receiver 30 for modulating control of the perturber structure loop 21 and the desired modulation of antenna current. With this system the transmitter 34 is provided with an input $F_M$ from a frequency reference source 36. Please note that reference frequency source 36 in addition to providing the frequency $F_M$ input to the transmitter 34 of the perturber modulation control system is also a reference frequency source through a frequency converter circuit 37 in developing a frequency F of the RF transmitter 38 used for feeding an input signal to the antenna element 11. The signal F is fed through a resistive pad network useful for the purposes of current and phase measurement testing and in preventing perturbing of the transmitter 38 so that it may be used to approximate a constant current generator. This resistive pad network includes a resistor 39 connected between the transmitter 38 output and ground and a resistor 40 serially in the connective signal path between the transmitter 38 and the antenna element 11 feed point 41. It should also be noted that the reference frequency source 36 is also provided with an output connection through a frequency converter circuit 42 providing an $F+F_M$ frequency signal output connected as an input to a receiver 43 of a phase measuring portion of the current distribution and phase measuring system 44 shown in FIG. 4.

A signal sensing connection from the feed point 41 of the antenna element 11 is provided through a resistive pad or divider circuit including serially connected resistors 45 and 46, with resistor 46 connected at one end to ground, and with the common junction of the resistors 45 and 46, with the sensed $F \pm F_M$ phase shifted signal, connected as an input to an RF bandpass filter 47. $F \pm F_M$ phase shifted signal, the sensed signal input to the current distribution and phase measuring system 44, as passed by the RF bandpass filter 47 is connected as an input to RF receiver 48, of conventional construction, including, however, as a part thereof an internal high frequency oscillator 49, a variable low frequency oscillator circuit 50 and an automatic voltage control (AVC) circuit section 51. The AVC circuit section 51 of receiver 48 is provided with a circuit connection to a dc voltmeter 52 in order that the AVC circuit section developed voltage may be used directly as an antenna current relative amplitude indicating measurement. The receiver 48 is also provided with an IF output connection to a phase meter 53 provided with an additional standard signal or reference signal input from the receiver 43. It should be noted, however, that RF receiver 43 while of standard construction generally is so modified as to receive high frequency oscillator signal and variable low frequency oscillator signal inputs from the HFO 49 and VFO 50 oscillator sections of the other RF receiver 48 in the current distribution and phase measuring system 44.

Please keep in mind while techniques for the direct measurement of antenna current distribution are plentiful that more direct methods are not always feasible and that such direct measurement is particularly unsuited to measurements on antennas consisting of long thin wirelike arms in that it is mechanically difficult, if not impossible, to carry a wire from a current probe through an antenna arm to measuring devices adjacent the feed point of the antenna. The current measuring technique as taught by applicant includes the introduction of an obstacle in the near field of the antenna to produce a perturbation of input impedance that is a known function of the current on the antenna structure near the obstacle. The obstacle is an antenna itself with an antenna circuit opened and closed to produce the modulation effect desired and takes advantage of relationships of reaction impedance between two antennas with the mutual impedance of two antennas given by the formula $$Z_{12} = -(AGB) \qquad (1)$$

where A represents the current distribution on one antenna with unit input current, B is the corresponding distribution of the other antenna and G is the propagator for the medium. The expression AG is the field due to current distribution A and hence represents the Fourier transform of A; if the medium is isotropic $$(AGB) = (BGA) \qquad (2)$$

and hence BG is the field radiated by current distribution B.

Another interesting property of the reaction concept is that the reaction of an antenna with itself is the negative of the input impedance or $$Z_{11} = -(AGA) \qquad (3)$$

If the medium of the antenna consists of free space everywhere except for a small obstacle it is sometimes convenient to express the effect of the obstacle on the antenna impedance as a perturbation for which $$Z \simeq -(AG_0A) - (AG_0MG_0A) \qquad (4)$$

where M is an operator which represents the scattering properties of the obstacle and $G_0$ is the propagator for free space. We may therefore identify the perturbation of $Z_{11}$ due to the obstacle as $$Z_{11} \simeq -(AG_0MG_0A) \qquad (5)$$

The current measurement problem then becomes that of finding an obstacle which causes expression (5) to be a function of the current on the antenna.

Consider a small conducting loop located near the antenna conductor and lying in a plane which contains the antenna. If the unit current distribution of this loop is represented by B the amplitude of the current induced in the loop is $$I_L = \frac{(AG_0B)}{j\omega L} \qquad (6)$$

where L is the inductance of the loop and A is the antenna current distribution. As $I_L$ is independent of position on the loop (if the loop is small) it is evident that $$(AG_0MG_0A) = \frac{(AG_0B)^2}{j\omega L} \qquad (7)$$

and hence a simple expression for the perturbation of input impedance is obtained.

From the concept of reaction $$(AG_0B) = -\int d^3r H_A \cdot K_B \qquad (8)$$

where $K_B$ is the equivalent magnetic dipole current distribution of the loop and the integration is over the length of this dipole. For a small loop of area S with unit current the magnetic dipole moment is $$K_B dl = j\omega\mu S \qquad (9)$$

where $dl$ is the length of the equivalent magnetic dipole. If the distance of the loop from the antenna conductor, R, is small $$H_A = \frac{I(z)}{2\pi R} \qquad (10)$$

where z is a coordinate which represents the distance of the point of measurement, and of the loop, from the antenna feed point and $I(z)$ is the antenna current distribution to be measured. The assumed orientation of the loop results in $H_A$ and $K_B$ having colinear directions over the range of integration in Formula 8. Hence $$(AG_0B) \simeq -j\frac{\omega\mu S I(z)}{2\pi R} \qquad (11)$$

and the perturbation of input impedance is $$\Delta Z_{11} \simeq -j\frac{\omega}{L}\left(\frac{\mu S I(z)}{2\pi R}\right)^2 \qquad (12)$$

Note that $\Delta Z_{11}$ is proportional to the square of $I(z)$; this means that some a prior knowledge of the behavior of the phase of $I(z)$ must be applied in resolving which root to use to extract $I(z)$ from measurements of $\Delta Z_{11}$. The general nature of the phase of $I(z)$ is ordinarily sufficiently well known from work that has been done with large scaling factors.

This shows that antenna current distribution can be inferred from the observed change in input impedance as a perturber is moved along the wire. It is apparent that small changes in input impedance will also be caused by vibration and movement of the wire in wind, so that it is necessary to in effect isolate those impedance changes due to the perturber. This can be accomplished quite readily by distinctively modulating the perturber, in this case a loop, in some way. A suitable method is to electronically open and short circuit the loop terminals at an audio frequency rate, $F_M$, thus amplitude modulating the wave reflected from the loop. The amplitude and phase of either sideband signal, at $F \pm F_M$, can then be observed at the antenna input terminals. The antenna current distribution is deduced from the change in amplitude and phase of the sideband signal as the loop is moved from the input terminals to the end of the antenna wire, tube, or rod.

With the two-receiver arrangement used to compare the phase of the current distribution signal to that of a standard signal, please note that the modulating signal for the loop, the output frequency of the transmitter, and the standard signal for phase comparison are derived from a common highly stable frequency standard source. A short term stability of 1 part in $10^{10}$ is required for 1 degree phase error at 30 mc. Use of two receivers with common conversion oscillators for the standard and current distribution signals eliminates the stability of the receiver oscillators as a source of error. The transmitter 38, used only as an amplifier, is padded to approximate a constant current generator, so that its output is not perturbed by the loop. The tunable RF bandpass filter 47 provides the necessary preselection of the sideband signal (at frequency $F+F_M$), which is obviously much lower in amplitude than the carrier signal (at frequency F). The RF bandpass filter 47 skirt selectivity of a filter used is such that 20 db relative rejection of the carrier can be achieved for 1% separation of the carrier and the sideband sinals; and 60 db rejection for 5% separation can be achieved. The latter will apply at 2 mc. and the former at 30 mc., approximately. Making $F_M$ greater than a few hundred kc. becomes impractical and undesirable, since the distance between the antennas of the loop modulation control radio link would otherwise require careful control.

The particular equipments that have been used in a system such as illustrated by FIG. 4 with respect to running measurement tests on an antenna model one-fourth the scale of a very large antenna proved to be capable of providing current distribution measurements over the range of from 2 mc. to 30 mc. which in terms of the full scale antenna translate to 500 kc. to 7.5 mc. With this particular lash up of equipments, the limiting factors at the low end of the range happens to be the particular RF bandpass filter 47 that was used. However, quite obviously bandpass filters can readily be obtained and used for the frequencies of interest in the 1 to 2 mc. range. If with the same equipments coverage of the 30 mc. to 36 mc. range were to be attempted, this would necessitate the utilization of relatively simple converters ahead of the two particular receivers used in the system as well as appropriate bandpass filters for the frequencies of interest.

It may be of interest to note that the perturber 12 that has been used was in form of a loop 21 two by two foot square and with the loop being two inches wide subject to being positioned as desired along the antenna wire by means of a rope and pulley structure as shown and as previously described. Further, all the wooden poles are well secured with dielectric guys to prevent electrical interference while providing for a stable structure. Further, with the antenna model tested, a number 8 Copperweld wire was suspended between ground and a wooden pole and deflected to the specified curve by means of a one-half inch Dacron rope catenary. The catenary, suspended between two wooden poles employed 3/16 inch diameter Dacron rope jumpers attached through fittings to the Copperweld wire. Further, while these jumpers may be of such length as to provide a straight antenna wire, they may be of such calculated lengths as to provide substantially any shaped antenna wire curve desired and, in fact, using horizontal displacement fittings and connections 28 shown in FIG. 3 with the tether lines 28a, the Copperweld wire may be deflected in the horizontal plane as well as in the vertical plane.

Referring at this point to FIG. 5, another antenna 10' element 11' configuration is shown similar in many respects to that of FIG. 1 with, however, the vertical jumper ropes 17' of such calculated length as to give a vertical curve to the antenna element wire 11'. With respect to this embodiment components substantially the same as those in the embodiment of FIG. 1 are given primed numbers and those the same are given the same numbers as a matter of convenience, and much of the explanation with respect to the FIG. 1 antenna embodiment is obviously equally applicable to the single curved wire antenna embodiment of FIG. 5. It should also be noted that the particular suspension means for the antenna element wire 11 illustrated in particular detail in FIGS. 2 and 3 and the particular roller suspension arrangement for the perturber loop 21 are not the only structural designs that may be employed for the mounting of an antenna element and for the sliding of the perturber loop or element along the antenna element and with substantially constant spacing and orientation of the perturber unit maintained throughout the range of sliding movement along the antenna element.

Whereas this invention is here illustrated and described with respect to several embodiments thereof, it should be realized that various changes may be made without departing from the essential contributions to the art made by the teachings hereof.

I claim:

1. In a system for measuring current distribution of an antenna element: a perturbing structure including a relatively small perturber antenna as related to the antenna element subject to measurement; said perturber antenna having an antenna circuit with switch means provided for opening and closing of the antenna circuit and inducing a signal modulation on said antenna element; control and driving means connected to said switch means for controlled opening and closing of the switch means in said perturbing structure; mounting means supporting said perturbing structure in substantially uniform spaced relation from said antenna element wheresoever the perturbing structure may be positioned along said antenna element; RF signal input means connected to said antenna element; and signal current measuring means connected to said antenna element; wherein said antenna element is an elongate conductive element of long length relative to its other dimensions; said mounting means supporting said perturber structure being adapted for movement of the perturber structure along the antenna element with grooved rollers guided and supported by, and rollable along the antenna element being measured; antenna element mounting means constructed to so support said antenna element being measured as to present substantially no physical barriers impeding movement of the perturber structure along the antenna element substantially throughout the length thereof; said control and driving means includes an RF receiver system in said perturbing structure; and an RF transmitter system is used for transmitting a signal to said RF receiver system for the control and driving means connected to said switch means in said perturbing structure.

2. The system for measuring current distribution of an antenna element of claim 1, wherein said signal current measuring means connected to said antenna element includes RF signal receiving means; said RF signal receiving means includes a first RF receiver with an AVC circuit; and a DC voltmeter is connected to the AVC circuit for providing antenna current relative amplitude readings.

3. The system for measuring current distribution of an antenna element of claim 2, wherein said RF signal receiving means also includes a second RF receiver said first and second RF receivers have a common high frequency oscillator and a common low frequency oscillator; said control and driving means includes an RF receiver system in said perturbing structure; a switching control RF transmitter is used for transmitting a signal to said RF receiver system for the control and driving means connected to said switch means; a standard frequency source is provided having an output connection as a frequency standard input to said switching control RF transmitter; said standard frequency source also having a circuit connection with said second RF receiver; a phase meter; and both said first and second RF receivers each having an output connection as inputs to said phase meter for providing antenna current relative phase readings.

4. The system for measuring current distribution of an antenna element of claim 3, wherein said RF signal source includes an RF transmitter having an output connection as the RF signal input means to the feed point of said antenna element; and with said standard frequency source signal path means connected to said RF signal source RF transmitter.

5. The system for measuring current distribution of an antenna element of claim 4, also including frequency converting circuit means in at least one output connection of said standard frequency source; a first resistive pad circuit in the connection from said RF signal source to said feed point; with said signal current measuring means connected to said antenna elemet substantially at the feed point of the antenna element; and with the connection between said signal current measuring means and the antenna element including a second resistive pad, and a bandpass filter circuit.

References Cited

UNITED STATES PATENTS

| | | | |
|---|---|---|---|
| 3,300,722 | 1/1967 | Iizuka | 325—67 |
| 1,923,916 | 8/1933 | Darbord | 325—67 |
| 1,982,331 | 11/1934 | Taylor | 325—67 |
| 3,081,432 | 3/1963 | Balwanz | 343—703 |

OTHER REFERENCES

Helicopter Measures Antenna Pattern by Helmut Brueckman, Electronics, pp. 134–136, November 19⁓⁓

ROBERT L. GRIFFIN, Primary Examiner

A. J. MAYER, Assistant Examiner

U.S. Cl. X.R.

343—703